July 2, 1940.  J. D. LOWE  2,206,703

WIRE REINFORCED CORD SET

Filed Nov. 26, 1937

Inventor:
James D. Lowe.
by Harry E. Dunham
His Attorney.

Patented July 2, 1940

2,206,703

UNITED STATES PATENT OFFICE 2,206,703

WIRE REINFORCED CORD SET

James D. Lowe, Bridgeport, Conn., assignor to General Electric Company, a corporation of New York Application November 26, 1937, Serial No. 176,464

1 Claim. (Cl. 173—322)

This invention relates to cord sets, and more particularly to extension cords having a reinforcing wire embedded therein.

It is customary in using portable electric appliances to employ an extension cord set. Such extension cord sets are usually very flexible with the result that the length of cord frequently becomes wrinkled or knotted between the two ends so that the life of the cord set is materially reduced.

It is an object of this invention to provide means in the form of a wire inserted within the extension cord which will prevent the cord from becoming kinked or wrinkled, which will absorb any pull or strain exerted upon the plugs at the ends of the cord set, and which, in addition, will hold the cord set in coiled position so that it occupies a small space at all times.

Figure 1:
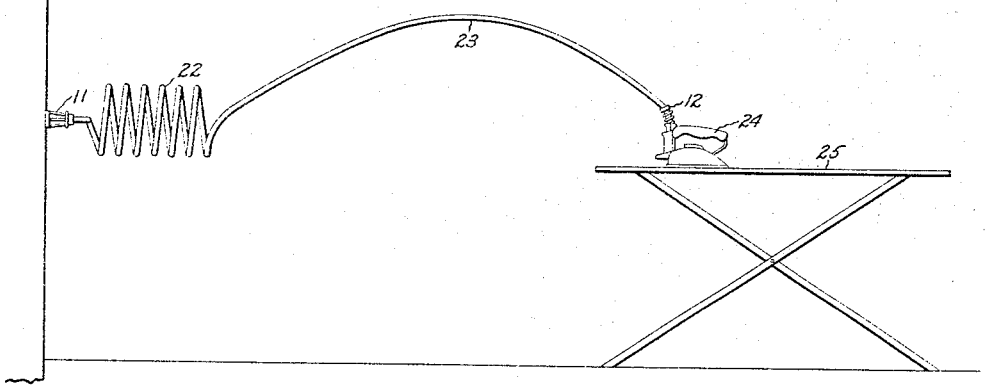
Figure 2:
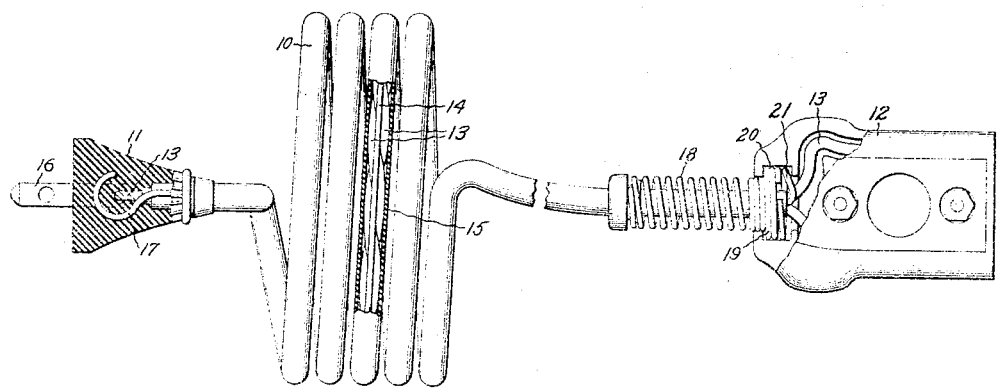

Referring to the drawing Fig. 1 shows a cord set embodying the invention as applied to an electric appliance; and Fig. 2 is a detailed view of the cord set.

The cord set comprises a cord 10 having at one end a plug cap 11 and at the other end a female plug 12. The cord 10 comprises two electrical conductors 13 which are twisted and placed in juxtaposition with a reinforcing wire 14. To secure the conductors and reinforcing wire together the wire and conductor are provided with an overall covering 15 of rubber tubing, or the like. In the manufacture of the cable the twisted conductors are placed upon one reel, and the reinforcing wire is placed on a similar reel and both are fed simultaneously through the braiding machine. At one end the conductors 13 are electrically connected to the plug prongs or terminals 16 so that the cord may be connected to an outlet box. At the corresponding end the wire 14 is bent at an angle to its axis and formed into a U-shaped loop 17 and thereafter the plug cap 11 is molded about the U-shaped loop 17, the prongs 16 and the rubber covering 15. In this manner the reinforcing wire 14 is fastened securely to the plug 11 at a point separate from the electrical connection between conductors 13 and the prongs 16, so that it absorbs any strain or pull which is transmitted to the plug cap by the cord. Under such conditions, it is difficult to loosen the electrical connection between the conducting wires 13 and the prongs 16.

The other end of the cord is connected to the female plug 12, the conducting wires 13 being electrically connected to the plug terminals (not shown). A strain relief member in the form of a coil spring 18 is placed around the end of the cord immediately adjacent the plug and an enlarged end 19 of the coil spring is inserted within a recess or groove 20 formed in the plug member 12 to secure the strain relief member in position. In order to secure the cord 10 to the plug member 12, the reinforcing wire 14 is bent at an angle to its axis and formed into a loop 21 which is inserted within the groove 20 immediately adjacent the enlarged coils of the strain relief member. In this manner the cord is fastened securely to the plug member, and it is impossible to apply strain to the conducting cords 13 and loosen their electrical connection to the plug because the coil 21 of the reinforcing wire will absorb any strain placed upon the cord 10 and transmit it directly to the plug member 12. The strain relief member 18 prevents any undue bending or breakage of the cord at the point where it joins the plug member.

In order to provide a cord set which may be of compact form and one which will not easily become knotted or entangled the cord may be coiled into the form of a helix. The completed cord with the reinforcing wire therein may be coiled upon a mandrel and the wire 14 is formed with sufficient stiffness so that the cord will retain its coiled form throughout its length of service. It will be apparent that the size and stiffness of the wire 14 may be varied at will and in accordance with the number of coils of cord necessary to a particular use so that the cord will maintain its coiled position.

The reinforcing wire acts to increase the useful life of the cord because it prevents the cord from being kinked or wrinkled and absorbs any strain placed upon the cord. The reinforcing wire also prevents loosening or disengagement of the electrical connections between the electrical conducting wires 13 and the plugs 11 and 12 because strains are transmitted to these plugs by the wire 14 rather than by the conducting wires 13.

In the form of the invention shown by Fig. 1 the cord is formed with a plurality of coils 22 immediately adjacent the plug 11. Extending between the coils 22 and the plug 12 is a bowed section of the cord 23 which maintains an arcuate form under the action of the stiff reinforcing wire 14. The bowed stiff portion of the cord prevents it from interfering with the normal use of an electrical appliance, in this instance, an electric iron 24, so that as the iron is passed back and forth across the ironing board 25 the cord will be held above the board and will not interfere with the ironing operation. At the same time the coils 22 act to prevent the cord from becoming wrinkled and maintain the cord in a compact position.

What I claim as new and desire to secure by Letters Patent of the United States is:

In a cord set, a plurality of conductors, a reinforcing wire extending parallel to and in juxtaposition with said conductors throughout their length, an insulating covering overlying said wire and conductors, a plug having terminals, said plug having a recess formed therein, and a strain relief member comprising a coil spring overlying said covering and having enlarged coils nested in said recess, the terminals of said plug being connected to one pair of ends of said conductors and the corresponding end of said reinforcing wire being bent at an angle to its axis to form a loop, said loop being nested within said recess adjacent said enlarged coils to secure the wire to said plug.

JAMES D. LOWE.